(No Model.)
F. H. MERRILL.
TREE PROTECTOR.
No. 304,343. Patented Sept. 2, 1884.
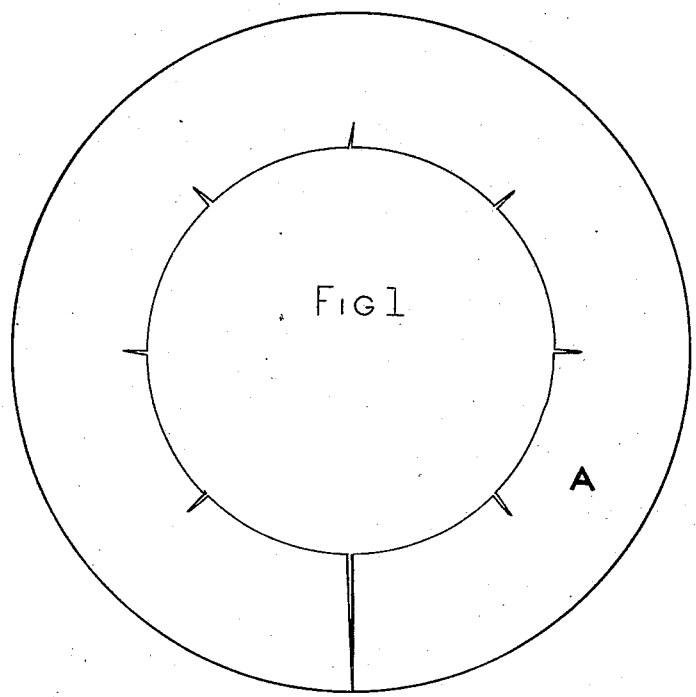
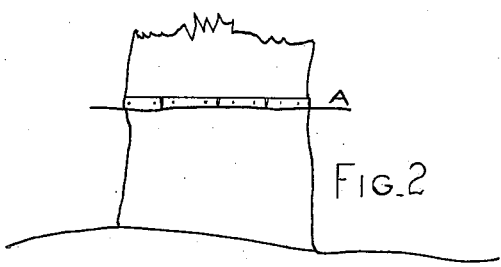
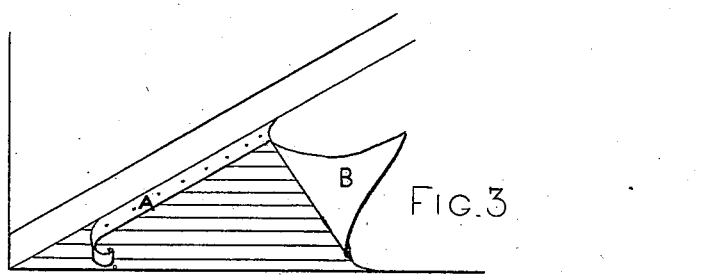
WITNESSES
H. L. Joachimsen
Thos. D. Leary
INVENTOR
Frank H. Merrill
by George Pardy
Atty

UNITED STATES PATENT OFFICE.

FRANK HANSON MERRILL, OF SAN FRANCISCO, CALIFORNIA.

TREE-PROTECTOR.

SPECIFICATION forming part of Letters Patent No. 304,343, dated September 2, 1884.

Application filed February 23, 1884. (No model.)

*To all whom it may concern:*

Be it known that I, FRANK HANSON MERRILL, a citizen of the United States, residing at San Francisco, State of California, have invented a new and useful device for protecting trees from the ravages of such insects as climb up the trunk from the ground, and house interiors from fleas, roaches, bugs, &c., of which the following is a specification.

My invention consists in narrow strips of suitable textile fabric coated with paint and saturated with a poisonous compound and applied to the trunks of trees, and around the skirting-boards of rooms in houses, as below described.

In the accompanying drawings, I show the outline of my tree-girt in Fig. 1, its application to the trunk of a tree in Fig. 2, and in Fig. 3 my poison-strip is shown applied at the skirting-board under the carpet in a room in a house.

A is the girt, collar, or strip, as the case may be, which ordinarily may be three inches wide, and having, when applied to trees, an interior diameter a little larger than the trunk of the tree it is to be applied to.

The material I have chosen as best suited to my purpose is canton flannel which has a good nap on one side, which easily retains my poisonous compound.

To prepare my collars and strips, I first coat the smooth side of the cloth with a good stiff coat of flour-paste, which I allow to dry hard. This I cover with a good stiff coat of oil-paint of any cheap kind, so as to give the cloth stiffness and make it water-proof. After this is dry I saturate the nap side with a strong solution of one part borax to four parts corrosive sublimate dissolved in hot water, only enough hot water being used to completely dissolve the parts. After the cloth is thoroughly dry I cut out the rings, girts, or strips, when they are ready to apply. The application is made by simply tacking the collars to the tree-trunk, nap side under, about a foot from the ground, taking care to leave no spaces between the collar and the tree for the insects to crawl through, but compel them to pass over the poisoned nap. Before they get completely over they will die from the effect of the poison and drop off to the ground. The strip I tack under the carpet B, nap side up, all around the skirting-board of the room. Any fleas, bugs, or roaches which come in contact with it will be poisoned.

What I claim as my invention is as follows:

1. The poison-strips herein described, consisting of the narrow pieces of cloth having a nap on one side saturated with insect-poison, the other being stiffened with a coating of paint, as and for the purpose set forth.

2. The poison-strips herein described for destroying insects, consisting of strips of nappy cloth painted on one side with a stiff coat of oil-paint, and saturated on the nap side with a strong solution of borax and corrosive sublimate, as and for the purpose set forth.

FRANK HANSON MERRILL.

Witnesses:
GEO. PARDY,
JOHN CHOICE.